United States Patent
Dombek et al.

(10) Patent No.: US 11,976,786 B2
(45) Date of Patent: May 7, 2024

(54) OIL RESTRICTOR FOR EMERGENCY LUBRICATION OF A COMPONENT FOR AN AIRCRAFT TURBINE ENGINE

(71) Applicant: SAFRAN TRANSMISSION SYSTEMS, Colombes (FR)

(72) Inventors: Alexis Claude Michel Dombek, Moissy-Cramayel (FR); Patrice Jocelyn Francis Gedin, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 47 days.

(21) Appl. No.: 17/642,169

(22) PCT Filed: Sep. 16, 2020

(86) PCT No.: PCT/FR2020/051595
§ 371 (c)(1),
(2) Date: Mar. 10, 2022

(87) PCT Pub. No.: WO2021/058893
PCT Pub. Date: Apr. 1, 2021

(65) Prior Publication Data
US 2022/0316652 A1   Oct. 6, 2022

(30) Foreign Application Priority Data

Sep. 24, 2019 (FR) ..................... 1910548

(51) Int. Cl.
*F16N 29/02* (2006.01)
*F01D 25/18* (2006.01)
(Continued)

(52) U.S. Cl.
CPC ........... *F16N 27/005* (2013.01); *F01D 25/18* (2013.01); *F02C 7/06* (2013.01); *F02C 7/36* (2013.01);
(Continued)

(58) Field of Classification Search
CPC ............... F16H 57/042; F16H 57/0486; F16H 2057/085; F16H 57/0479; F16H 57/082;
(Continued)

(56) References Cited

U.S. PATENT DOCUMENTS 2,632,996 A    3/1953  Rood
9,429,225 B2 * 8/2016  Feraud ................ F16H 57/0479
(Continued)

FOREIGN PATENT DOCUMENTS

DE    2028743 A1 * 12/1971
EP    3 159 578 A1    4/2017
(Continued)

OTHER PUBLICATIONS

English translation of DE2028743A1; http://translationportal.epo.org; Aug. 23, 2023 (Year: 2023).*
(Continued)

*Primary Examiner* — Roger L Pang
(74) *Attorney, Agent, or Firm* — CHRISTENSEN O'CONNOR JOHNSON KINDNESS PLLC (57) ABSTRACT

An oil restrictor for emergency lubrication of a component for an aircraft turbine engine includes a metal cylindrical body having a longitudinal axis and configured to be housed in and shrink-fitted into a cylindrical bore of a part of the turbine engine. The restrictor further includes an integrated oil circuit enabling oil to pass through the restrictor along the axial extent thereof. The body is a one-piece body, and the circuit has at least two oil channels recessed on an outer cylindrical surface of the body and extending around and/or along the axis.

13 Claims, 10 Drawing Sheets

(51) Int. Cl.
　　　*F02C 7/06*　　　(2006.01)
　　　*F02C 7/36*　　　(2006.01)
　　　*F16H 57/04*　　(2010.01)
　　　*F16N 27/00*　　(2006.01)
　　　*F16H 57/08*　　(2006.01)

(52) U.S. Cl.
　　　CPC ....... *F16H 57/042* (2013.01); *F16H 57/0479* (2013.01); *F16N 29/02* (2013.01); *F05D 2220/32* (2013.01); *F05D 2260/98* (2013.01); *F16H 57/0469* (2013.01); *F16H 57/082* (2013.01); *F16H 2057/085* (2013.01)

(58) Field of Classification Search
　　　CPC ........ F16N 27/005; F16N 29/02; F01D 25/18; F02C 7/06; F02C 7/36; F05D 2200/32; F05D 2260/98; F05D 2240/54
　　　USPC ............... 475/159, 160; 184/6.11, 6.12
　　　See application file for complete search history.

(56) References Cited

U.S. PATENT DOCUMENTS

| | | | |
|---|---|---|---|
| 2013/0045078 A1* | 2/2013 | Boldt | F04D 29/047 415/110 |
| 2015/0252945 A1 | 9/2015 | Rippelmeyer et al. | |
| 2022/0065173 A1* | 3/2022 | Uhkötter | F02C 7/36 |

FOREIGN PATENT DOCUMENTS

| | | | | |
|---|---|---|---|---|
| FR | 2 995 055 A1 | 3/2014 | | |
| FR | 3 047 284 A1 | 8/2017 | | |
| FR | 3 066 792 A1 | 11/2018 | | |
| FR | 3 071 293 A1 | 3/2019 | | |
| GB | 2501787 A | * 11/2013 | ........... | F16N 27/005 |
| JP | 3217622 B2 | 10/2001 | | |
| WO | 2014/037659 A1 | 3/2014 | | |

OTHER PUBLICATIONS

English translation of FR3071293A1; http://translationportal.epo.org; Aug. 23, 2023 (Year: 2023).*

International Search Report dated Dec. 7, 2020, issued in corresponding International Application No. PCT/FR2020/051595, filed Sep. 16, 2020, 6 pages.

Written Opinion dated Dec. 7, 2020, issued in corresponding International Application No. PCT/FR2020/051595, filed Sep. 16, 2020, 7 pages.

English translation of Written Opinion dated Dec. 7, 2020, issued in corresponding International Application No. PCT/FR2020/051595, filed Sep. 16, 2020, 5 pages.

International Preliminary Report on Patentability dated Mar. 15, 2022, issued in corresponding International Application No. PCT/FR2020/051595, filed Sep. 16, 2020, 8 pages.

* cited by examiner

OIL RESTRICTOR FOR EMERGENCY LUBRICATION OF A COMPONENT FOR AN AIRCRAFT TURBINE ENGINE

FIELD OF THE DISCLOSURE

The present disclosure relates to an oil restrictor for the emergency lubrication of a component for an aircraft turbine engine.

BACKGROUND

The prior art comprises in particular, the documents FR-A1-2 995 055, FR-A1-3 047 284, FR-A1-3 066 792, US-A1-2015/252945, FR-A1-3 071 293, US-A1-2,632,996, EP-A1-3 159 578, JP-B2-3 217 622 and WO-A1-2014/037659.

A fluid restrictor or fluid restriction device is a device that is used to reduce the passage of a fluid. A restrictor allows the passage of fluid but in a limited or controlled manner. In the case of an aircraft turbine engine, a restrictor is housed in a bore in a part to control the amount of fluid passing through that bore for example.

An oil restrictor can for example be used for the emergency lubrication of a mechanical reduction gear for a turbine engine.

The role of a mechanical reduction gear is to change the speed and torque ratio between the input and output shaft of a mechanical system.

The newer generations of dual flow turbine engines, in particular those with high bypass ratios, comprise a mechanical reduction gear to drive the shaft of a fan. Typically, the purpose of the reduction gear is to transform the so-called fast rotational speed of the shaft of a power turbine into a slower rotational speed for the shaft driving the fan.

Such a reduction gear comprises a central pinion, called the sun gear, a ring gear and pinions called planet gears, which are engaged between the sun gear and the ring gear. The planet gears are held by a frame called a planet carrier. The sun gear, ring gear and planet carrier are planetary gears because their axes of revolution coincide with the longitudinal axis X of the turbine engine. The planet gears each have a different axis of revolution equally spaced on the same operating diameter around the axis of the planetary gears. These axes are parallel to the longitudinal axis X.

There are several reduction gear architectures. In the prior art of dual flow turbine engine, the reduction gears are of the planetary or epicyclic type. In other similar applications, there are so-called differential or "compound" architectures.
  in a planetary reduction gear, the planet carrier is fixed, and the ring gear is the output shaft of the device, which turns in the opposite direction to the sun gear.
  on an epicyclic reduction gear, the ring gear is fixed, and the planet carrier is the output shaft of the device which rotates in the same direction as the sun gear.
  on a compound gearbox, no component is fixed in rotation. The ring gear rotates in the opposite direction to the sun gear and the planet carrier.

The reduction gears can be composed of one or more meshing stages. This meshing is achieved in different ways, such as by contact, friction or magnetic fields. There are several types of contact meshing, such as straight or herringbone toothing.

The planet gears can be guided in rotation by plain bearings, each of which comprises a tubular body whose internal cavity is supplied with lubricating oil. The oil is supplied to the inner cavity and is conveyed to an outer guiding surface through oil passage orifices. During operation, the plain bearings must be lubricated continuously and an interruption in the oil supply to the bearings is problematic. A solution to this problem has been found by equipping the plain bearings with oil restrictors. In addition to the oil passage orifices, each plain bearing comprises at least one bore in which an oil restrictor is housed and shrunk. In the event of an interruption in the oil supply to a plain bearing, the restrictor enables to limit the passage of oil from the cavity to the guide surface, so that a smaller quantity of oil can be conveyed to this surface but for a longer period of time (of the order of 15 to 30 seconds, for example). Without such a restrictor, the oil would not reach the surface or would pass through the bore too quickly, with the result that the plain bearing would not be lubricated at all after a short time (a few seconds) after the oil supply has been interrupted.

To ensure the passage through the restrictor, the latter includes an integrated circuit for oil passage.

An example of an embodiment of such a restrictor is described in the document WO-A1-2014/037659 of the applicant. Although particularly effective, this restrictor comprises a metal cylindrical body formed of several superimposed pellets which are to be indexed with respect to each other and applied against each other inside the bore. The pellets comprise different parts of the oil circuit, which are brought into fluid communication when the pellets are stacked and indexed.

The manufacture of these pellets is complex, and the final performance of the restrictor is highly dependent on the quality and tolerances of manufacture. The assembly of the pellets in the bore is complex and has required the development of dedicated tooling with no assurance that a good assembly will be achieved. In particular, if the different pellets are not in contact with each other during the assembly, the restrictor will not function correctly. In addition, there is a significant risk that the pellets will be ejected during operation due to the short shrinkage length.

The present disclosure provides a solution to at least some of these problems, which is simple, effective and economical.

SUMMARY

The disclosure relates to an oil restrictor for the emergency lubrication of a component for an aircraft turbine engine, the restrictor comprising a cylindrical body, for example metallic, which extends along a longitudinal axis and is configured to be housed and shrink-fitted in a cylindrical bore of a part of the turbine engine, this restrictor comprising an integrated oil circuit for the passage of oil through the restrictor along its axial extent, characterised in that the body is a one-piece body, and in that the integrated oil circuit comprises at least two oil channels recessed on an outer cylindrical surface of the body and extending around and/or along the axis.

The disclosure allows to simplify the manufacture and assembly of a fluid restrictor for a turbine engine. It also eliminates the risk of performance losses during the assembly and reduces the risk of ejection and clogging of the restrictor during operation. In order to simplify the assembly, one of the challenges is to eliminate the angular orientation that currently exists between the different pellets to ensure fluid communication between the different parts of the oil circuit formed in the pellets. The technical solution proposed consists of eliminating the stacking of pellets and making the entire body in a one-piece body. The single piece defines the oil circuit at its periphery, together with the bore of the part.

The restrictor according to the disclosure may comprise one or more of the following features, taken in isolation from each other, or in combination with each other:

the restrictor comprises at least two, and possibly three, oil channels extending helically on the outer surface of the body, the body comprises first and second opposite longitudinal ends each provided with a longitudinal end face radial to the longitudinal axis, each of the helical channels comprises a first channel end opening at the first longitudinal end of the body, and an opposite second channel end in fluid communication with a duct of the body, this duct having a substantially radial orientation with respect to the longitudinal axis and extending between this second channel end and a blind hole formed in the centre of the radial face of the second longitudinal end of the body, the restrictor comprises a plurality of ducts which are each connected to a respective helical channel, the ducts are evenly distributed around the axis, the ducts open into the blind hole in a first plane which is perpendicular to the longitudinal axis, this first plane being located at a first distance from the radial face of the second longitudinal end of the body, the first distance being less than a second distance between the radial face of the second longitudinal end of the body and a second plane perpendicular to the longitudinal axis and passing through a bottom of the blind hole, and which represents for example between 30 and 80% of this second distance, the restrictor comprises a first annular row of at least two, preferably at least four, rectilinear channels parallel to each other and to the longitudinal axis, regularly distributed around this longitudinal axis, the restrictor comprises at least a second annular row of at least two, preferably at least four, rectilinear channels parallel to each other and to the longitudinal axis, regularly distributed around this axis, the channels of the first row being circumferentially offset around the longitudinal axis with respect to the channels of the second or further row, and the channels of the first row being separated from the channels of the second or further row by an annular groove formed on the outer surface of the body and extending around the longitudinal axis, said or each annular groove has a depth greater than a depth of the channels of each row, the restrictor comprises:

the oil circuit has abrupt variations such as bends, cross-sectional variations, sectional separations and reunions, etc, the oil circuit is configured to generate pressure drops when oil flows through this circuit, the oil circuit comprises at least one particle trap, the blind hole or annular groove forms a particle trap, the blind hole is configured to cooperate with a tool for mounting and/or dismounting the restrictor, the body has an axial length or extent greater than its diameter, the body comprises an end radial face comprising a blind hole substantially at its centre, the body comprises at each of its axial ends a radial face comprising a blind hole substantially in the centre thereof, the blind holes are of different sizes and functions, the restrictor is symmetrical to avoid the mounting direction, and the restrictor comprises straight longitudinal channels parallel to each other, which extend over only part of the length of the body, and circumferential channels connecting the longitudinal channels to each other, with a first and a second longitudinal channel opening at an opposite axial end of the body to allow the passage of oil through the restrictor along its axial extent.

The present disclosure also relates to a mechanical reduction gear for a turbine engine, in particular for an aircraft, comprising a sun gear, a ring gear extending around the sun gear, and planet gears meshed with the sun gear and the ring gear, the planet gears being guided by bearings of a planet carrier, each of these bearings comprising an internal cavity supplied with oil and an outer guiding cylindrical surface, each of the bearings further comprising oil passage orifices extending from the cavity to the outer surface, and at least one bore extending from the cavity to the outer surface and in which is housed and shrink-fitted a restrictor as described above.

The disclosure further relates to a turbine engine, in particular an aircraft turbine engine, comprising a restrictor or gearbox as described above.

DESCRIPTION OF THE DRAWINGS

Further features and advantages will be apparent from the following description of a non-limiting embodiment of the disclosure with reference to the attached drawings in which.

DETAILED DESCRIPTION

Figure 1:
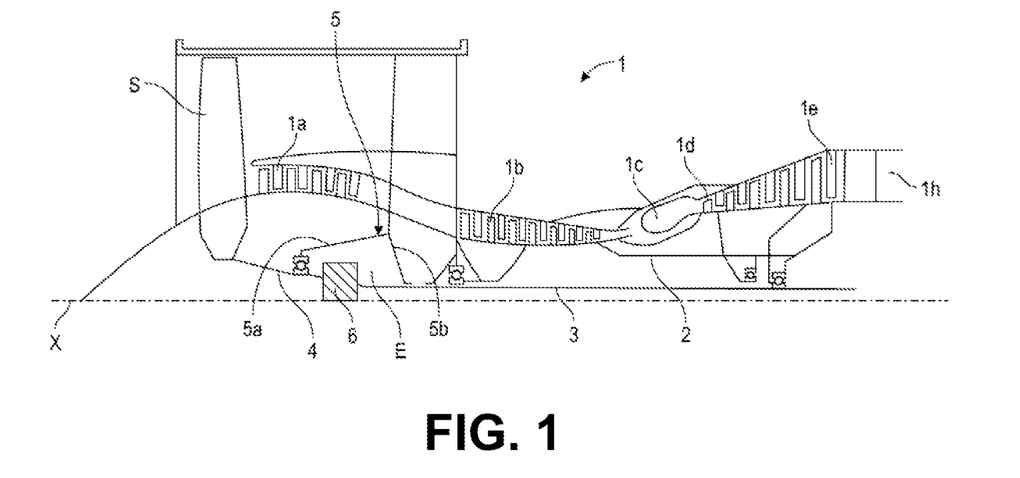
FIG. 1 is a schematic axial sectional view of a turbine engine using the disclosure.

FIG. 1 describes a turbine engine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) casing.

The fan S is driven by a fan shaft 4 which is driven to the LP shaft 3 by means of a reduction gear 6. This reduction gear 6 is generally of the planetary or epicyclic type.

Although the following description refers to a planetary or epicyclic type reduction gear, it also applies to a mechanical differential in which the three elements, namely the planet carriers, the ring gear and the sun gear, are mobile in rotation, the rotational speed of one of these elements being dependent, in particular, on the speed difference of the other two elements.

The reduction gear 6 is positioned in the upstream part of the turbine engine. A fixed structure comprising schematically, here, an upstream part 5a and a downstream part 5b which makes up the engine casing or stator 5 is arranged so as to form an enclosure E surrounding the reduction gear 6. This enclosure E is closed upstream by seals at the level of a bearing allowing the passage of the fan shaft 4, and downstream by seals at the level of the passage of the LP shaft 3.

Figure 2:
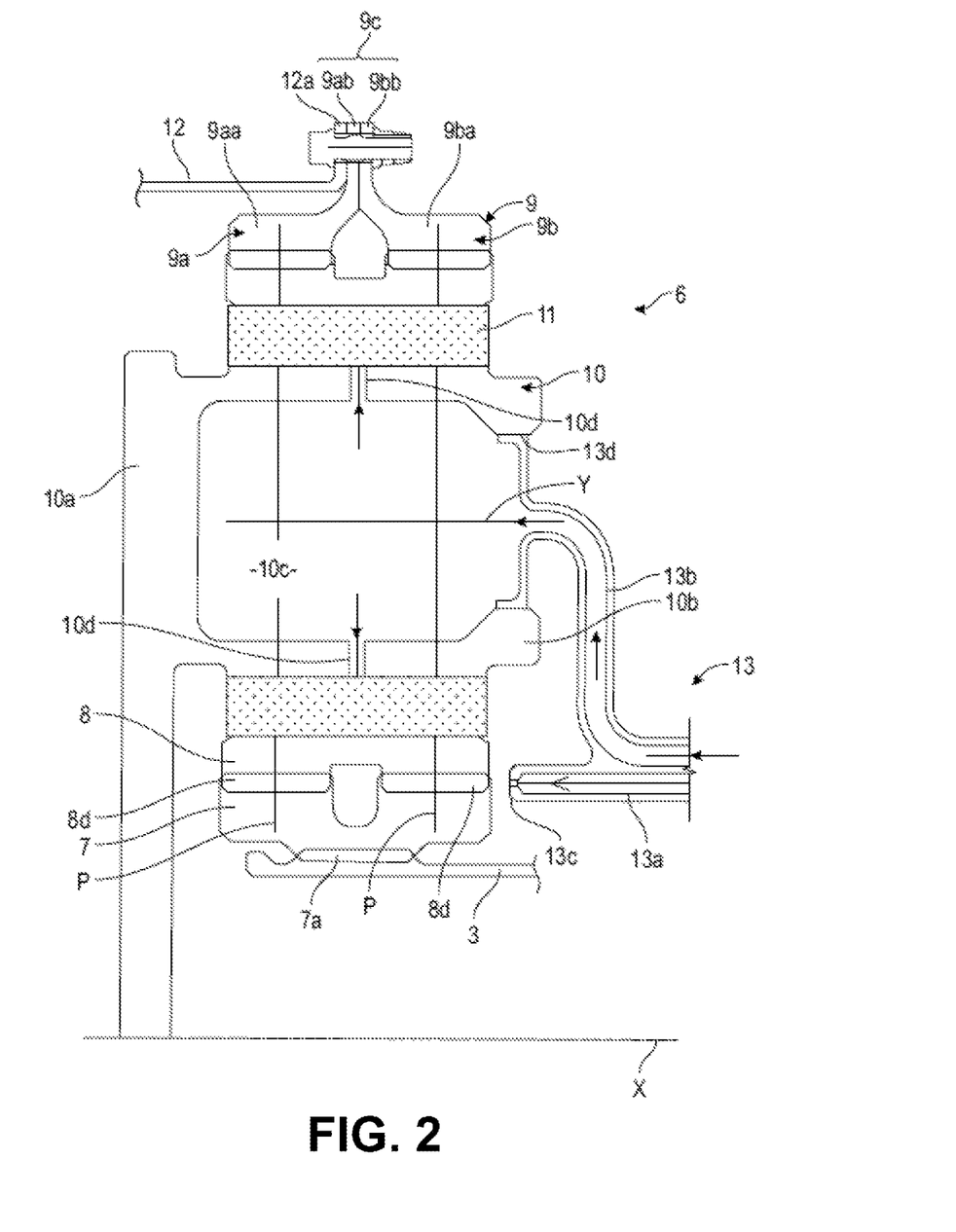
FIG. 2 is a partial schematic view of a mechanical reduction gear in axial section.

FIG. 2 shows a reduction gear 6 which can take the form of different architectures depending on whether certain parts are fixed or rotating. On the input side, the reduction gear 6 is connected to the LP shaft 3, for example via internal splines 7a. Thus, the LP shaft 3 drives a planetary pinion called the sun gear 7. Classically, the sun gear 7, whose axis of rotation is coincident with that of the turbine engine X, drives a series of pinions called planet gears 8, which are equally spaced on the same diameter around the axis of rotation X. This diameter is equal to twice the operating centre distance between the sun gear 7 and the planet gears 8. The number of planet gears 8 is generally defined between three and seven for this type of application.

All the planet gears 8 are held together by a frame called a planet carrier 10. Each planet gear 8 rotates around its own axis Y and meshes with the ring gear 9.

At the output we have:
In an epicyclic configuration, all the planet gears 8 rotates the planet carrier 10 around the axis X of the turbine engine. The ring gear is attached to the engine casing or stator 5 via a ring gear carrier 12 and the planet carrier 10 is attached to the fan shaft 4.
In a planetary configuration, all the planet gears 8 are held by a planet carrier 10 which is fixed to the motor housing or stator 5. Each planet gear drives the ring gear which is attached to the fan shaft 4 via a ring gear carrier 12.

Each planet gear 8 is mounted freely rotatably by means of a bearing 11, for example of the rolling bearing or hydrodynamic plain bearing type. In the case of a plain bearing, the bearing 11 comprises a tubular body 10b and the tubular bodies of the individual plain bearings are positioned relative to each other and are carried by a structural frame 10a of the planet carrier 10. There are a number of bearings 11 equal to the number of planet gears 8. For reasons of operation, assembly, manufacture, inspection, repair or replacement, the bearings 11 (and in particular the tubular bodies 10b) and the frame 10a may be separated into several parts.

For the same reasons mentioned above, the toothing 8d of a reduction gear can be separated into several helices, each with a median plane P. In our example, we detail the operation of a multi-helix reduction gear with a ring gear separated into two half ring gears:

an upstream half ring gear 9a consisting of a rim 9aa and a mounting half-flange 9ab. On the rim 9aa is the upstream helix of the toothing. This upstream helix meshes with that of the planet gear 8 which meshes with that of the sun gear 7.

a downstream half-ring gear 9b consisting of a rim 9ba and a mounting half-flange 9bb. The downstream helix of the toothing is located on the rim 9ba of the reduction gear. This downstream helix meshes with that of the planet gear 8 which meshes with that of the sun gear 7.

Although the helix widths vary between the sun gear 7, the planet gears 8 and the ring gear 9 due to the overlapping of the toothing, they are all centred on a median plane P for the upstream helixes and on another median plane P for the downstream helixes.

The mounting half-flange 9ab of the upstream ring 9a and the mounting half-flange 9bb of the downstream ring 9b form the mounting flange 9c of the ring. The ring gear 9 is attached to a ring gear carrier by joining the mounting flange 9c of the ring gear and the mounting flange 12a of the ring gear carrier by means of a bolted connection, for example.

The arrows in FIG. 2 describe the oil flow in the reduction gear 6. The oil enters the reduction gear 6 from the stator part 5 into the distributor 13 by different means, which will not be specified in this view because they are specific to one or more types of architecture. The distributor is separated into two parts, each of which is repeated by the same number of planet gears. The function of the injectors 13a is to lubricate the toothing and the function of the arms 13b is to lubricate the bearings 11. The oil is supplied to the injectors 13a and exits through the ends 13c to lubricate the toothing of the planet gears 8, the sun gear 7 and also the ring gear 9 with oil. The oil is also supplied to the arm 13b and circulates via the supply mouth 13d of the body 10b into an internal cavity 10c of the latter. The oil then flows through this cavity 10c to supply oil passage orifices 10d to an outer guiding cylindrical surface of the corresponding planet gear.

Figure 3:
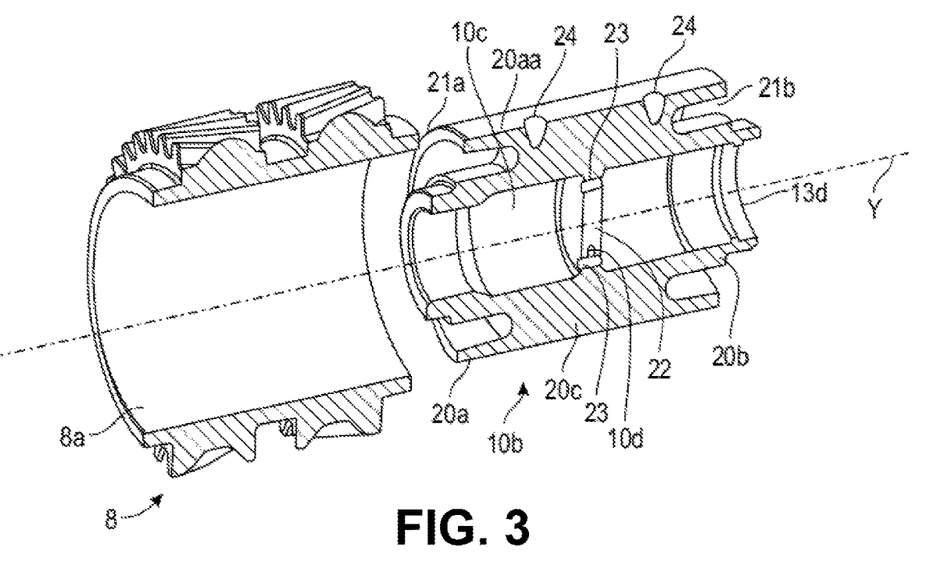
FIG. 3 is a schematic axial sectional perspective view of a plain bearing and a planet gear of a mechanical reduction gear.

FIG. 3 shows a more concrete embodiment of a plain bearing and its tubular body 10b for a reduction gear planet gear 8.

The tubular body 10b comprises two coaxial annular walls 20a, 20b which extend around each other and are connected to each other by an annular web 20c.

The inner annular wall 20b has at least one open axial end defining the aforementioned supply mouth 13d, for receiving the oil supplied by the distributor (not shown). The inner wall 20b thus defines the cavity 10c for receiving lubricating oil.

The outer annular wall 20a has an axial length or dimension measured along the axis Y which is close to that of the wall 20b. The wall 20a comprises an outer cylindrical surface 20aa which is configured to define with an inner cylindrical surface 8a of the bearing 8 an annular space for receiving oil and forming an oil film for the formation of the hydrodynamic bearing.

The web 20c has a smaller length measured in the same way, so that the axial ends of the walls 20a, 20b define annular grooves 21a, 21b between them. This configuration allows the body 10b to be flexible at each of its axial ends.

The body 10b further comprises a transverse bulkhead 22 located in the cavity 10c, substantially in the middle of the cavity along the axis Y. This bulkhead 22 is connected at its periphery to the inner surface of the wall 20a and comprises ducts 23 for bringing into fluid communication the two sections of the cavity 10c between which the bulkhead 22 extends.

The body 10b comprises orifices 10d for the passage of lubricating oil from the cavity 10c to the outer periphery of the support 10b, and in particular to the surface 20aa. In the example shown, these orifices 10d are formed in the middle of the body 10b, with respect to the extent of the body along the axis Y and extend from the ducts 23 to the surface 20aa through the bulkhead 23, the inner wall 20b, the web 20c and finally the outer wall 20a.

The cavity 10c is continuously supplied with oil during operation. This oil enters the cavity 10c and then the ducts 23 and is conveyed through the orifices 10d to the surface 20aa. The centrifugal forces applied to the planet carrier and the bodies 10b during operation are sufficient to ensure this oil circulation.

In the event of an oil supply failure, the ducts 23 and orifices 10d are no longer supplied with oil and a small amount of oil remains plated on the inner surface of the wall 20a of each body 10b as the planet carrier continues to rotate. In this particular case, in order to continue to lubricate the planet gear 8 for a certain period of time (e.g., 15 to 30 seconds), it is known to provide bores 24 in the body 10b, which extend between the cavity 10c and the surface 20aa and in which oil restrictors are housed and shrunk.

An oil restrictor is used to reduce and control the amount of oil flowing through a bore, for example by increasing the distance travelled by the oil and/or by increasing the pressure drop during the flow of the oil.

The present disclosure provides an improvement to restrictors of the current technique.

A first embodiment is illustrated in FIGS. 4 to 7.

Figure 4:
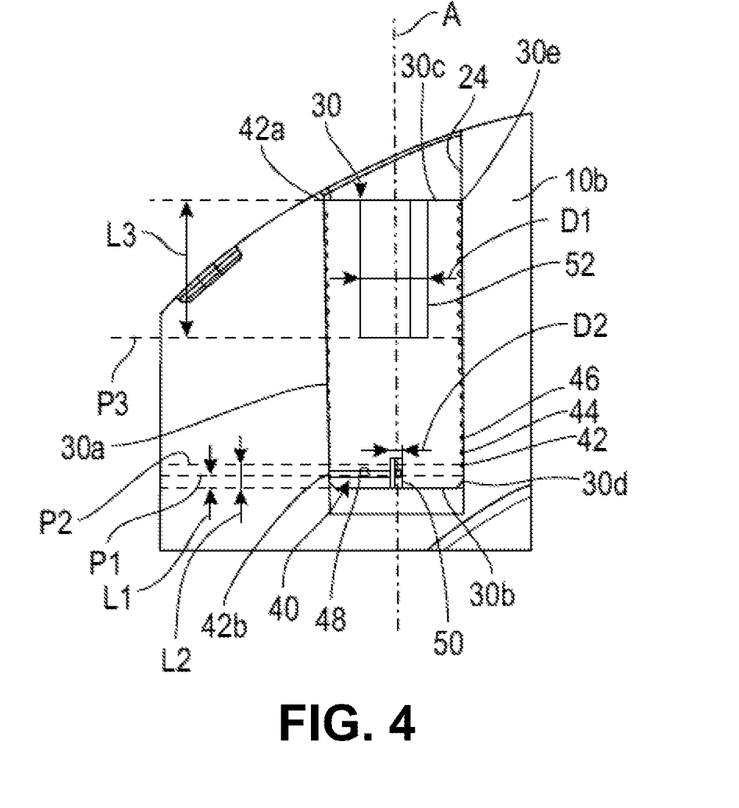
FIG. 4 is a schematic view in partial section and on a larger scale of a plain bearing equipped with a restrictor according to an embodiment of the disclosure.
Figure 5:
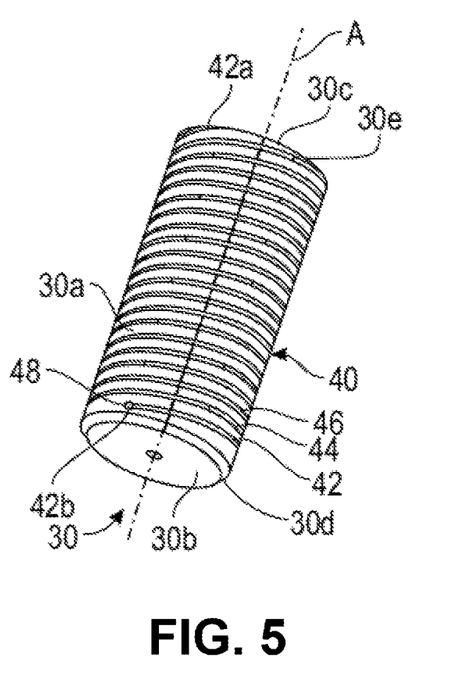
FIG. 5 is a larger scale schematic perspective view of the restrictor of FIG. 4.

The restrictor 30 is in the form of a one-piece metal cylindrical body having a longitudinal axis denoted A. The restrictor 30 is configured to be housed and shrink-fitted in the bore 24 of the body 10b or any other turbine engine part.

The restrictor 30 comprises an outer cylindrical surface 30a and two flat, transverse or radial faces 30b, 30c at its axial ends. The peripheral annular edges 30d, 30e located at the axial ends of the body, at the interfaces between the surfaces 30a, 30b, 30c may or may not be chamfered, as is the case with the edge 30d located at the level of the face 30b.

The restrictor 30 comprises an integrated oil circuit 40 for the passage of oil through the restrictor along its axial extent. In the example shown, this circuit 40 comprises at least two oil channels, and for example three oil channels 42, 44, 46, recessed on the surface 30a and extending around and/or along the axis A.

The channels 42-46 here extend helically over the outer surface 30a. They extend adjacent to each other at a constant pitch, measured along the axis A.

Each of the channels 42-46 comprises a first longitudinal end 42a opening onto the face 30c, and a second opposite longitudinal end 42b in fluid communication with a duct 48 of the body.

Each duct 48 is located adjacent to face 30b and has a substantially radial orientation with respect to axis A. Each duct 48 extends between the end 42b and a blind hole 50 formed in the centre of the face 30b.

Figure 6:
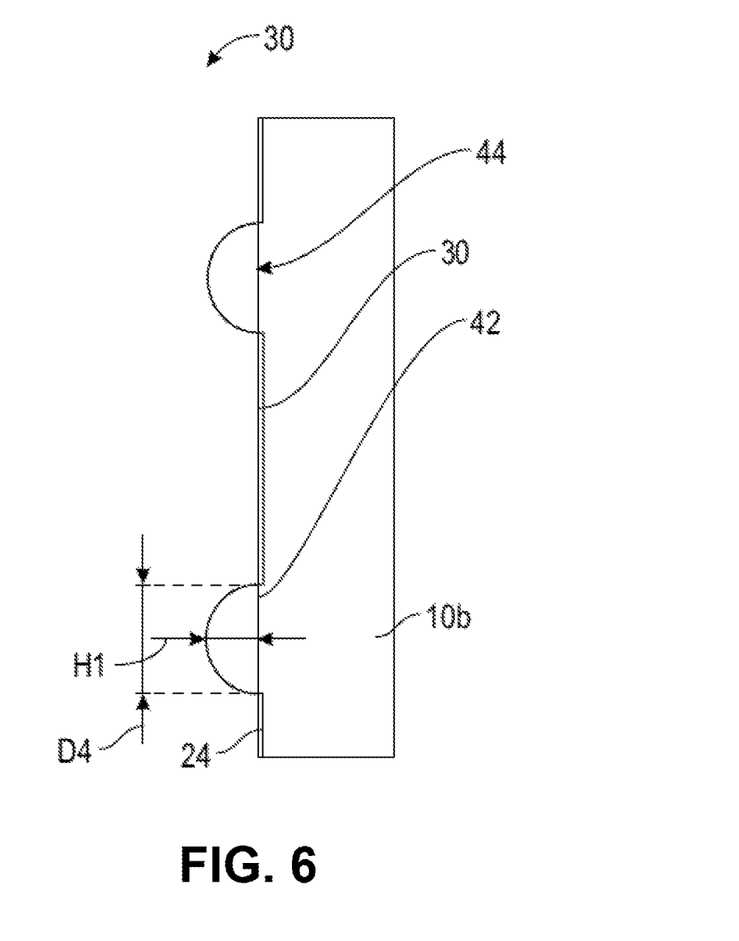
FIG. 6 is an even larger scale schematic view of a detail of FIG. 4.

The ducts 48 are evenly distributed around the axis A. They open into the blind hole 50 in a first plane P1 which is perpendicular to the axis A. This plane P1 is located at a first distance L1 from the face 30b which is less than a second distance L2 between this face 30b and a second plane P2 perpendicular to the axis A and passing through the bottom of the blind hole 50. L1 represents for example between 30 and 80% of L2.

The face 30c comprises another blind hole 52 in its centre. Here, the diameter D1 of the blind hole 52 is significantly larger than the diameter D2 of the blind hole 52. Furthermore, the distance L2, corresponding to the depth of the hole 50, is significantly less than the depth of the hole 52, which corresponds to the distance L3 between the face 30c and a third plane P3 perpendicular to the axis A and passing through the bottom of the blind hole 52. L3 may represent between 30 and 70% of the axial extent of the restrictor 30.

Figure 7:
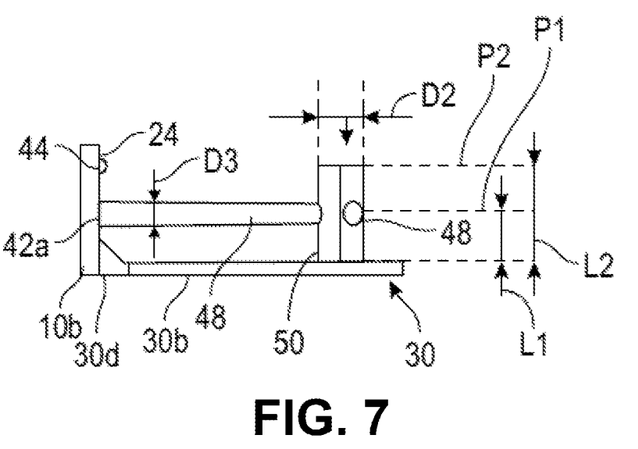
FIG. 7 is an even larger scale schematic view of a further detail of FIG. 4.

It can also be seen that the hole 50 has a diameter D1 greater than the diameter D3 of the ducts 48 and the depth H1 of the channels 42-46. This depth H1 is for example substantially equal to or less than half the diameter D4 of the channels 42-46 (FIG. 7).

The holes 50, 52 therefore have different dimensions and have different functions here. The hole 50 here has a particle trap function, as will be described in more detail in the following. The hole 52 has an assembly/disassembly function as it is configured to cooperate with a particular tool to facilitate the assembly and disassembly of the restrictor, and in particular its shrink-fit into the bore.

In operation, oil flows centrifugally through the bore 24 to the face 30b. This oil penetrates into the hole 50 and any polluting particles it may contain are trapped by remaining at the bottom of the hole 50, due to the gap between the aforementioned planes P1 and P2. The oil then flows through the ducts 48 to the channels 42-46 and then flows in these channels 42-46 around the body and inside the bore 24. These channels 42-46 slow down the oil and create pressure drops. The oil then reaches the face 30c to feed the surface 20aa of the planet gear bearing.

Figure 8:
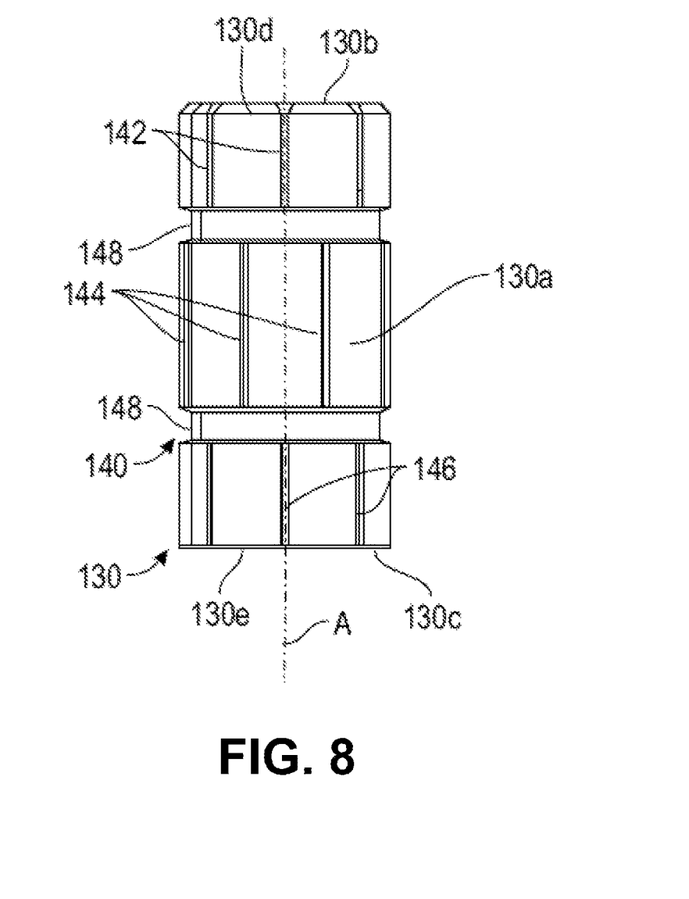
FIG. 8 is a schematic perspective view of a restrictor according to an alternative embodiment of the disclosure.
Figure 9:
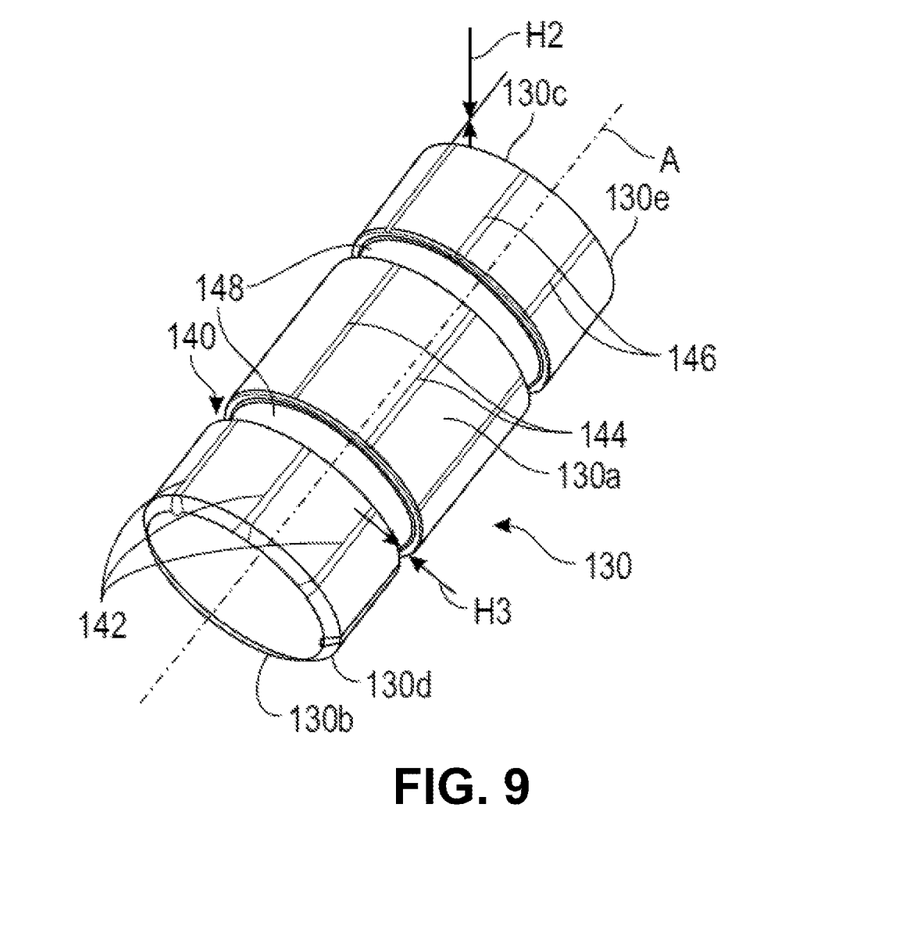
FIG. 9 is a further schematic perspective view of the restrictor of FIG. 8.

FIGS. 8 and 9 illustrate an alternative embodiment of a restrictor 130 according to the disclosure.

The restrictor 130 is in the form of a one-piece metal cylindrical body having a longitudinal axis denoted A. The restrictor 130 is configured to be housed and shrink-fitted in the bore 24 of the body 10b or any other turbine engine part.

The restrictor 130 comprises an outer cylindrical surface 130a and two flat and transverse or radial faces 130b, 130c at its axial ends. The peripheral annular edges 130d, 130e located at the axial ends of the body, at the interfaces between the surfaces 130a, 130b, 130c may or may not be chamfered as is the case with the edge 130d located at the face 130b.

The restrictor 130 comprises an integrated oil circuit 140 for the passage of oil through the restrictor along its axial extent. In the example shown, this circuit 140 comprises annular rows of at least four straight channels 142, 144, 146 parallel to each other and to the axis A, evenly distributed around this axis.

In the example shown, the number of rows is three, the rows of channels being separated from each other by annular grooves 148 formed on the surface 130a and extending around the axis A. The grooves 148 are here two in number.

The channels 142 of the first row are located on a first axial section of the body which extends axially from the face 130b to one of the two grooves 148. The channels 144 of the second row are located on an intermediate axial section of the body which extends axially between the two grooves 148. The channels 146 of the last row are located on a third axial section of the body which extends axially from the face 130c to one of the two grooves 148.

The number of channels 142-146 is identical for the different rows and is eight in the example shown. It can be seen from the drawings that the annular grooves 148 have a depth H2 which is identical to each other and which is greater than the depth H3 of the channels 142-146. The channels 142-146 here have identical depths H3. It can also be seen that, although the channels 142, 146 are aligned in pairs along the axis A, this is not the case with the channels 144 which are angularly offset from the channels 142, 146.

In operation, oil flows centrifugally through the bore 24 to the face 130b. This oil enters the channels 142 and flows to the first groove 148 which forms a first particle trap due to the difference in depths with the channels 142-146. The oil then flows through the channels 144 to the second groove 148 which forms another particle trap for the same reason. The oil then flows through channels 146 to the face 130c of the restrictor, inside bore 24. The channels 142-146 and grooves 148 slow down the oil and create pressure losses due to the misalignment between the channels 142-146. The oil then reaches the surface 20aa of the planet gear bearing.

In the prior art, pressure drops in the restrictor were generated by changes in cross-section and changes in direction of the fluid, which required complex geometries to be designed and manufactured. In the proposed embodiments, the pressure drops are generated continuously only via the channels 42-26, 142-146 of the integrated circuit to the restrictor, which greatly simplifies the design and manufacture. The channels only need to be sized (length and diameter in particular) to achieve the desired pressure drop.

Figure 10:
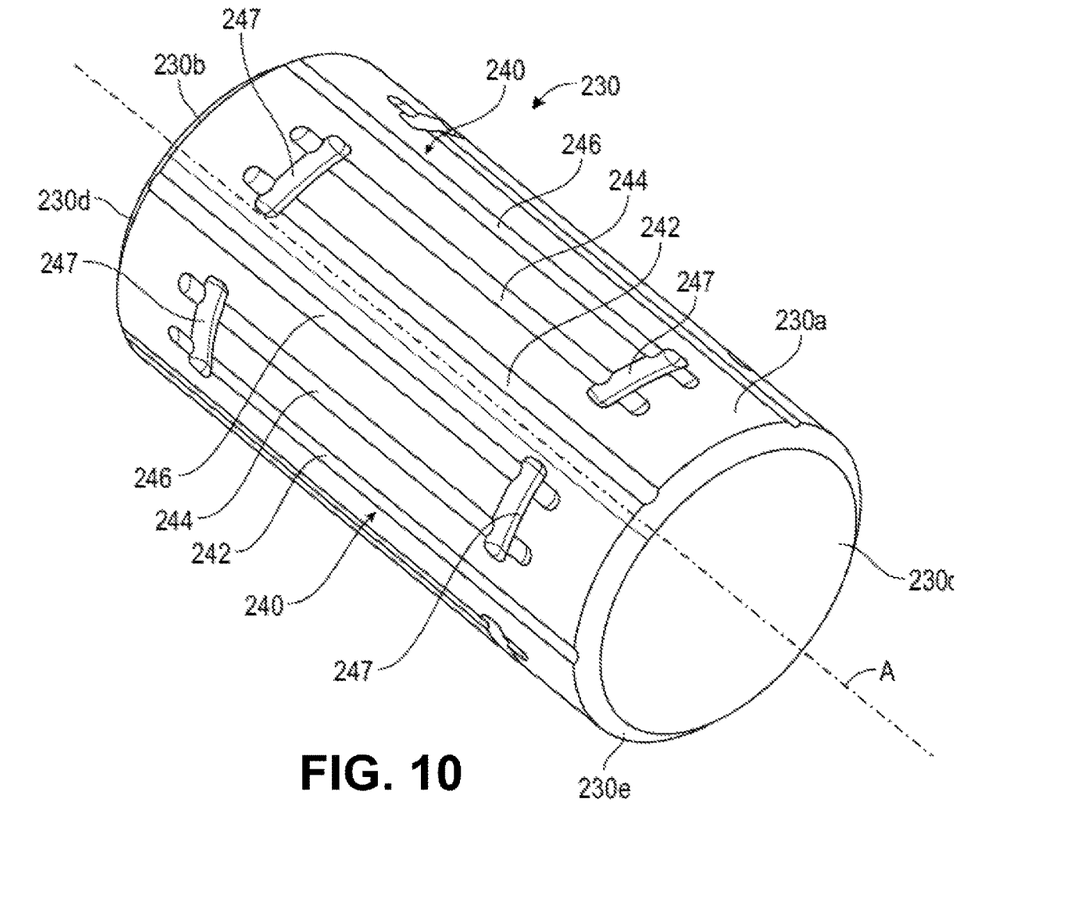
FIG. 10 is a schematic perspective view of a restrictor according to another alternative embodiment of the disclosure.

FIG. 10 illustrates a variant of a restrictor 230 according to the disclosure.

The restrictor 230 is in the form of a one-piece metal cylindrical body whose longitudinal axis is noted A. The restrictor 230 is configured to be housed and shrink-fitted in the bore 24 of the body 10b or any other part of turbine engine.

The restrictor 230 comprises an outer cylindrical surface 230a and two flat, transverse or radial faces 230b, 230c at its axial ends. The peripheral annular edges 230d, 230e at the axial ends of the body at the interfaces between the surfaces 230a, 230b, 230c may be chamfered.

The restrictor 230 comprises an integrated oil circuit 240 for the passage of oil through the restrictor along its axial extent. In the example shown, this circuit 240 comprises, on the one hand, straight longitudinal channels 242, 244, 246 parallel to each other and to the axis A, and evenly distributed around this axis.

The circuit 240 also comprises circumferential channels 247 connecting the channels 242, 244, 246 to each other.

The channels 242, 244, 246 extend over only part of the length of the body measured along the axis. The channels 242 each have a longitudinal end which opens onto the face 230c, and an opposite longitudinal end which is connected by a channel 247 to a first end of a channel 244. This channel 244 extends between the channel 242 to which it is connected and a channel 246 to which it is also connected. The second opposite end of channel 247 is connected by another channel 247 to a longitudinal end of channel 246, the opposite longitudinal end of which opens onto face 230b.

Oil can thus flow from one side of the body to the other, via a plurality of sets of channels 242, 244, 246, 247. The sets of channels, for example 6 or 7 in number, are regularly distributed around the axis A.

As in the example shown, the longitudinal ends of the channels 242, 244, 246 connected to the channels 247 may be extended along the axis A to form blind ends forming particle traps.

The risk of loss of sealing between the individual pellets during assembly of the restrictor in the previous technique is eliminated by sealing the channels in the shrink fit with the bearing. There is no longer any risk of reducing the seal during assembly.

In order to reduce the risk of blockage and clogging in the event of oil pollution, the circuit is separated into several independent channels supplied in a distinct manner, which makes it possible, in the event of blockage of one of the channels (or even of its supply duct 48), to ensure the passage of oil into the other channels (or ducts). The circuit also includes at least one particle trap. Via the centrifugal field, the particles are concentrated at the top of the hole 50 or at the bottom of the grooves 148, and do not block the channels.

The benefits of the disclosure include:
speed and modularity of design of this type of restrictor,
reduction in the cost and time of manufacturing the restrictor,
simplification and rapidity of assembly operations of the restrictor,
reduction of risks during assembly and manufacture of the restrictor, and
reduction of risks in operation.

The disclosure has a particular, but not limited, application to a mechanical reduction gear and is intended to facilitate the flow of oil during operation to discharge the oil through the restrictors to the planet gear bearings.

The invention claimed is:

1. An oil restrictor for the emergency lubrication of a component for an aircraft turbine engine, the restrictor comprising a cylindrical body extending along a longitudinal axis and configured to be housed and shrink-fitted in a cylindrical bore of a part of the turbine engine, the restrictor further comprising an integrated oil circuit configured to provide passage of oil through the restrictor along an axial extent of the restrictor, wherein the body is a one-piece body, and the integrated oil circuit comprises at least two oil channels recessed on a single outer cylindrical surface of the body and extending around and/or along said axis, and wherein said at least two oil channels are independent from each other and remote from each other so as not to communicate directly with one another.

2. The restrictor according to claim 1, further comprising at least two oil channels extending helically on the single outer surface of the body.

3. The restrictor according to claim 2, wherein the body comprises first and second opposite longitudinal ends each provided with a longitudinal end face radial to the longitudinal axis, each of the helical channels comprising a first channel end opening at the first longitudinal end of the body and an opposite second channel end in fluid communication with a duct of the body, the duct having a radial orientation with respect to said longitudinal axis and extending between said second channel end and a blind hole formed in a center of the radial face of the second longitudinal end of the body.

4. The restrictor according to claim 3, further comprising a plurality of ducts each connected to a respective helical channel, the ducts being evenly distributed around said axis.

5. The restrictor according to claim 4, wherein the ducts open into the blind hole in a first plane which is perpendicular to said longitudinal axis, the first plane being located at a first distance from said radial face of the second longitudinal end of the body, the first distance being less than a second distance between the radial face of the second longitudinal end of the body and a second plane perpendicular to said longitudinal axis and passing through a bottom of the blind hole, and which represents between 30 and 80% of this second distance.

6. The restrictor according to claim 1, further comprising a first annular row of at least two rectilinear channels parallel to each other and to said longitudinal axis and being regularly distributed around this longitudinal axis.

7. The restrictor according to claim 6, further comprising at least a second annular row of at least two, rectilinear channels parallel to each other and to said longitudinal axis and being regularly distributed around this axis, the channels of the first row being circumferentially offset around the longitudinal axis with respect to the channels of the second or further row, and the channels of the first row being separated from the channels of the second or further row by an annular groove formed on the single outer surface of the body and extending around said longitudinal axis.

8. The restrictor of claim 7, wherein said or each annular groove has a depth greater than a depth of said channels of each row.

9. The restrictor according to claim 1, further comprising straight longitudinal channels parallel to each other, which extend along only part of the length of said body, and circumferential channels connecting the longitudinal channels to each other, with a first and second longitudinal channel opening at an opposite axial end of the body and configured to provide passage of oil through the restrictor along its axial extent.

10. A mechanical reduction gear for a turbine engine, comprising a sun gear, a ring gear extending around the sun gear, and planet gears meshed with the sun gear and the ring gear, said planet gears being guided by plain bearings of a planet carrier, each of the plain bearings comprising an internal cavity supplied with oil and an outer guiding cylindrical surface, each of the plain bearings further comprising oil passage orifices extending from said cavity to said outer guiding cylindrical surface, as well as at least one bore extending from said cavity to said outer guiding cylindrical surface and in which is housed and shrink-fitted a restrictor according to claim 1.

11. A turbine engine, comprising at least one restrictor according to claim 1.

12. A turbine engine, comprising a mechanical reduction gear according to claim 10.

13. An oil restrictor for the emergency lubrication of a component for an aircraft turbine engine, the restrictor comprising a cylindrical body extending along a longitudinal axis and configured to be housed and shrink-fitted in a cylindrical bore of a part of the turbine engine, the restrictor further comprising an integrated oil circuit configured to provide passage of oil through the restrictor along an axial extent of the restrictor, wherein the body is a one-piece body, and the integrated oil circuit comprises at least two oil channels recessed on an outer cylindrical surface of the body and extending around and/or along said axis, wherein the body comprises first and second opposite longitudinal ends each provided with a longitudinal end face radial to the longitudinal axis, each of the oil channels comprising a first channel end opening at the first longitudinal end of the body and an opposite second channel end in fluid communication with a duct of the body, the duct having a radial orientation with respect to said longitudinal axis and extending between said second channel end and a blind hole formed in a center of the radial face of the second longitudinal end of the body.

* * * * *